(12) United States Patent
Battistini et al.

(10) Patent No.: US 9,034,936 B2
(45) Date of Patent: May 19, 2015

(54) FLAME RETARDANT POLYURETHANE FOAMS CONTAINING BIURET LINKAGES

(75) Inventors: Alessia Battistini, Massenzatico (IT); Gianluca Casagrande, Castelfranco Emilia (IT); Luigi Bertucelli, Reggio Emilia (IT); Alessio Sabadini, Reggio Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 397 days.

(21) Appl. No.: 13/512,177

(22) PCT Filed: Dec. 16, 2010

(86) PCT No.: PCT/EP2010/069986
§ 371 (c)(1),
(2), (4) Date: May 25, 2012

(87) PCT Pub. No.: WO2011/073355
PCT Pub. Date: Jun. 23, 2011

(65) Prior Publication Data
US 2012/0289619 A1    Nov. 15, 2012

(30) Foreign Application Priority Data

Dec. 18, 2009    (IT) .............................. MI2009A2227

(51) Int. Cl.
| C08G 18/00 | (2006.01) |
| C08G 18/78 | (2006.01) |
| C08G 18/40 | (2006.01) |
| C08G 18/48 | (2006.01) |
| C08G 101/00 | (2006.01) |

(52) U.S. Cl.
CPC ........ *C08G 18/7831* (2013.01); *C08G 18/4072* (2013.01); *C08G 18/409* (2013.01); *C08G 18/4812* (2013.01); *C08G 18/4816* (2013.01); *C08G 18/4837* (2013.01); *C08G 18/4841* (2013.01); *C08G 2101/0008* (2013.01); *C08G 2101/0083* (2013.01)

(58) Field of Classification Search
CPC .................................................... C08G 18/7831
USPC .......................................................... 521/174
See application file for complete search history.

(56) References Cited

U.S. PATENT DOCUMENTS

| 3,981,828 | A |   | 9/1976 | Demou |
| 4,221,877 | A |   | 9/1980 | Cuscurida |
| 4,243,756 | A |   | 1/1981 | Cenker |
| 4,803,229 | A |   | 2/1989 | Narayan |
| 4,810,729 | A |   | 3/1989 | Davis |
| 5,114,988 | A |   | 5/1992 | Gagnon |
| 5,198,473 | A |   | 3/1993 | Gallagher |
| 5,420,170 | A |   | 5/1995 | Lutter |
| 5,773,483 | A | * | 6/1998 | Eling et al. ..................... 521/125 |
| 6,946,497 | B2 | * | 9/2005 | Yu ................. 521/174 |

FOREIGN PATENT DOCUMENTS

| GB | 889050 A | 2/1962 |
| GB | 1384771 A | 2/1975 |
| WO | 02-051904 A | 7/2002 |
| WO | 2008-144224 A | 11/2008 |

* cited by examiner

*Primary Examiner* — Melissa Rioja
(74) *Attorney, Agent, or Firm* — Gary C Cohn PLLC

(57) ABSTRACT

Polyurethane foams are made using a biuret-modified MDI and/or PMDI as the isocyanate component. The isocyanate is characterized by having a high content of biuret-containing oligomers and, preferably, a low proportion (if any) of biuret-urea oligomers. Flexible, resilient foams made using this biuret-modified isocyanate perform well on flammability tests such as the UNI 9175 CS. E. RF4 test, even without added flame retardants.

5 Claims, No Drawings

FLAME RETARDANT POLYURETHANE FOAMS CONTAINING BIURET LINKAGES

This invention relates to flame-retardant, resilient, flexible polyurethane foams and methods for preparing same. This invention also relates to a polyisocyanate composition that is useful or preparing such foams.

Flexible polyurethane foam is used in a wide range of cushioning applications. Among these are cushions for various types of seating products. These seating products may be, for example, home furnishings such as chairs, sofas, recliners, benches, chaises, ottomans, and similar products. Other seating products include cushioned furniture for office or institutional use, as well as seats for automobiles and other vehicles. A typical product of this type will include one or more polyurethane foam cushions that are covered with some fabric.

These polyurethane foams are generally characterized as elastomeric or "flexible" by virtue of being easily compressible and, "resilient", in that, when a compressive force is removed, the foam recovers its original shape rapidly and with force. These attributes are usually expressed quantitatively as "indentation load deflection", which measures the force needed to compress the foam by a specified proportion of its original thickness, and by a ball rebound test, in which a ball is dropped onto the foam from a specified height, and the height to which the ball bounces is measured. Flexible polyurethane foams for seating applications generally exhibit a value of at least 40% and more typically at least 50% on the ball rebound test of ASTM D3574.

Polyurethane foams, being organic materials, are susceptible to combustion, and their cellular nature compounds this problem because of the ease with which oxygen and heat can permeate the foam to support the combustion process. This flammability is a very significant safety concern, and as a result many jurisdictions have specified that these foams, or furniture made from them, pass certain flammability tests. The tests vary from jurisdiction to jurisdiction.

For furniture, two important tests are the UNI 9175 C.S.E RF4 test and the California 117 test. These tests attempt to reproduce actual fire conditions as closely as possible. The UNI 9175 C.S.E. RF4 test, for example, is intended to mimic the situation in which a typical chair or sofa is exposed to a small ignition source such as a lighted cigarette, match or cigarette lighter. Naked (uncovered) foam should be classified as 3 IM or higher on this test, and an upholstered piece of furniture should be classified as 1 IM on this test.

It is usually necessary to incorporate some flame retardant into the foams to enable them to pass the flammability tests. Common flame retardants include various halogenated compounds, phosphorus compounds, as well as materials such as melamine. These can be effective, in that foams which pass the flame retardancy tests can be prepared using them, but several problems exist. Many halogenated flame retardants are becoming subjected to regulatory pressure and for that reason are becoming phased out or may be phased out. Other flame retardants produce a lot of smoke or can contribute to the toxicity of the combustion gases Many are expensive. Ideally, it would be desirable to provide a polyurethane foam which can pass these fire tests with a reduced amount of these flame retardants, or no added flame retardants at all.

However, the flame retardancy cannot be achieved at the expense of needed physical and other performance properties.

It is common practice in the industry to prepare foams of differing hardness (i.e., load-bearing capacity) using the same processing equipment. These manufacturers strongly prefer to use the same polyol and polyisocyanate formulations to produce the foams of various hardness, using the ratio of polyisocyanate component to polyol component as the process variable which controls hardness. Therefore, the foam formulation should be processable into good quality foam that has adequate flame retardant properties, over a range of polyisocyanate indices.

This invention is a process for preparing a flexible polyurethane foam, comprising
A. forming a reaction mixture including at least one polyol that has a hydroxyl equivalent weight of 800 or more, water, at least one polyisocyanate, at least one catalyst; and
B. subjecting the reaction mixture to conditions sufficient to cause the reaction mixture to expand and cure to form a polyurethane foam having a density of from 1.8 to 4 pounds per cubic foot and which exhibits a value of at least 40% on the ASTM D 3574 ball rebound test, wherein
the polyisocyanate is a diphenylmethane diisocyanate and/or polymethylene polyphenylisocyanate, which is modified to contain at least 20% by weight of biuret-containing oligomers that have three or more isocyanate groups.

Preferably, the reaction mixture also contains a small amount of an alkali metal carboxylate salt.

The presence of the biuret groups in the polyisocyanate mixture, and consequently in the polyurethane foam, has been found to impart significant flame retardant properties, as measured by standardized tests such as the UNI 9175 C.S.E. RF4 and the California 117 tests mentioned before. In particular, the naked (uncovered) foam often meets the requirements of a class 3 IM or even class 1 IM rating on the UNI 9175 C.S.E. RF4 test, even when prepared without added flame retardants. In addition, the polyurethane foams made in accordance with the invention often have excellent physical and performance properties, notably load bearing, resiliency, tensile, tear and elongation properties. The process is also flexible, and can be operated over a range of isocyanate indices to produce foams of varying hardness which have useful properties, including good flame retardancy as measured on the standardized tests mentioned before.

The isocyanate used in this invention is a diphenylmethane diisocyanate or a polymethylene polyphenylisocyanate, which is modified to contain oligomers that contain one or more biuret groups. The diphenylmethane diisocyanate or polymethylene polyphenylisocyanate starting materials can be generally described as condensation products of aniline and formaldehyde, which are further reacted with phosgene to convert amino groups to isocyanate groups. Diphenylmethane diisocyanate (MDI) is a two-ring structure which predominantly exists as the 2,4'- and 4,4'-isomers, as follows:

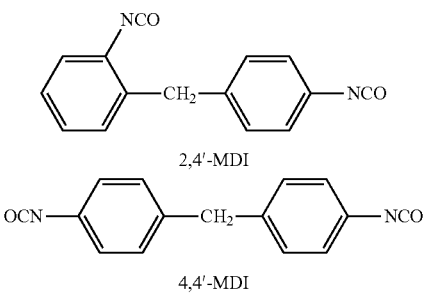

Polymethylene polyphenylisocyanate (PMDI) products contains one or more molecules having at least three phenylisocyanate groups which are linked by N−1 methylene groups, where N represents the number of phenylisocyanate groups in the molecule. PMDI products typically include a mixture of species in which N is 3, 4, 5, 6 or even more, together with varying amounts of MDI, which can be the 2,4'-, 4,4'-isomer, or a mixture thereof. MDI molecules and the N=3 species tend to be predominant in commercially available PMDI products, with the higher molecular weight compounds being present in increasingly smaller proportions as the value of N increases. Suitable PMDI products may have an average of from 2.2 to 4 isocyanate groups per molecule. Their isocyanate equivalent weight, prior to biuret formation, may be from about 127 to 150.

Biuret-containing oligomers are introduced into the MDI or PMDI starting material through a reaction with water, certain amine compounds, monosubstituted ureas such as N,N'-dialkyl urea compounds, formic acid and tertiary alcohol compounds. Water is a preferred biureting reagent because of its low cost and because it tends to react cleanly without forming large quantities of unwanted by-products. Water reacts with two polyisocyanate groups to produce a urea structure; further reaction of this urea structure with a third polyisocyanate molecule produces a biuret group. The biuret group takes the form

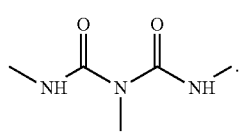
(I)

in which each of the nitrogen atoms is bonded to the residue (after removal of an isocyanate group) of a molecule of the starting polyisocyanate. The biuret oligomer contains at least one biuret group as shown in structure I, and contains at least three isocyanate groups. Thus, for example, a biuret oligomer molecules formed from three molecules of 4,4'-MDI and one molecule of water has the structure II

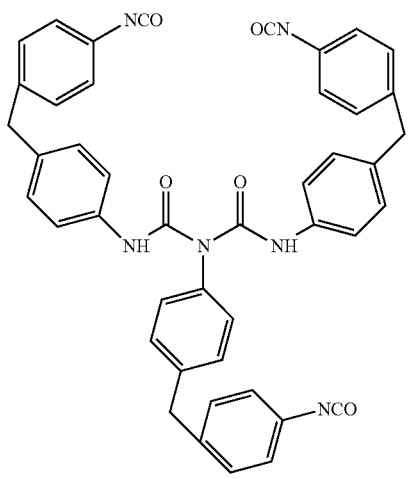
(II)

Analogous structures form when biuret oligomer molecules are formed using 2,4'-MDI, a mixture of 2,4'- and 4,4'-MDI, or a PMDI product as the starting material. One or more of the remaining isocyanate groups on a biuret oligomer molecules such as that shown in structure II can react with additional water and more of the isocyanate-containing molecules to produce higher molecular weight oligomers containing multiple biuret linkages. This reaction is believed to proceed step-wise, with an intermediate urea group being formed first, which is then converted to an additional biuret linkage. Thus, for example, the structure II material can react with a molecule of water and an additional molecule of 4,4'-MDI to form a biuret urea having the structure III

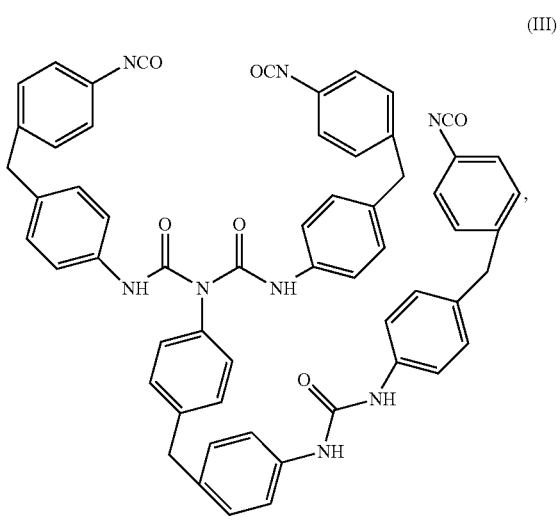
(III)

which then reacts with another isocyanate molecule to produce a bis-biuret oligomer molecule such as that having the structure IV:

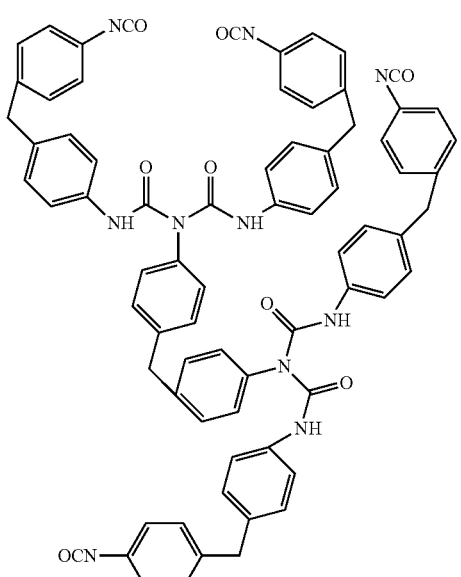
(IV)

As before, structures analogous to those shown in structures III and IV are produced when the isocyanate is 2,4'-MDI, a mixture of 2,4'-MDI and 4,4'-MDI, or a PMDI product. Note also that either of the urea nitrogens shown in structure III can react with an isocyanate group to form the second biuret linkage.

A bis-biuret oligomer molecule such as that exemplified by structure IV can of course undergo further reactions with water and additional isocyanate compounds to form even higher molecular weight molecules that have three or more biuret groups. As before, these reactions each proceed through a urea group-containing intermediate, analogous to that exemplified in structure III. The number of isocyanate groups contained by the biuret oligomer molecule will increase with the number of biuret linkages. The number of isocyanate groups on a biuret oligomer molecule is generally equal to two plus the number of biuret linkages.

A polyisocyanate composition for use in this invention contains at least 20% by weight of the biuret oligomers. These biuret oligomers may constitute up to 80% or more of the weight of the polyisocyanate mixture. A preferred amount is from 20 to 60% and a more preferred amount is from 25 to 50%, by weight.

The biuret-containing polyisocyanate can be produced by reacting 2,4'-MDI, 4,4'-MDI, a mixture of 2,4'- and 4,4'-MDI, or a polymethylene polyphenylisocyanate, with water. From about 1.0 to about 3 parts by weight water per 100 parts by weight of the starting polyisocyanate(s) are generally sufficient to produce the requisite amount of biuret linkages. It is preferred to heat the isocyanate to about 80 to 120° C. before mixing it with the water. The water can be added gradually to the isocyanate to help control the reaction. Urea groups tend to form rapidly, but the reaction of the urea groups with additional isocyanate groups to form the biuret linkages tends to proceed more slowly. Therefore, it is usually helpful to cook down the reaction mixture, after the water has been added, at a temperature of from 110 to 150° C., preferably from 110 to 130° C., to convert the urea groups to biuret linkages. The reaction should be continued until the content of urea-containing molecules in the reaction mixture is reduced to no greater than 5% by weight, and more preferably to no greater than 2% by weight.

It is usually beneficial, from a production standpoint, to produce a mixture that contains more of the biuret oligomers than are needed, and to dilute the mixture with more MDI or PMDI to produce the final product. Thus, for example, water and polyisocyanate can be reacted to form an intermediate which contains from 50 to 80% by weight of biuret oligomers. Such intermediates tend to be very viscous, and can be diluted with additional MDI or PMDI to reduce both the biuret oligomer level and the viscosity to desirable levels. It is often desirable to perform the water/isocyanate reaction on 2,4'-MDI, 4,4'-MDI or a mixture thereof, and to perform the dilution step with a PMDI. However, it is possible to use the same polyisocyanate in both steps, or to perform the biuret-forming reaction on a PMDI and dilute the intermediate with 2,4'- and/or 4,4'-MDI.

The product biuret-modified polyisocyanate preferably has, in addition to a biuret oligomer content as described before, (1) no more than 5% by weight and preferably no more than 2% by weight of urea-group containing oligomers (including biuret-urea oligomers) and (2) an isocyanate content of from 20 to 30% (isocyanate equivalent weight of from 140 to 210), preferably from 23 to 28% (isocyanate equivalent weight of from 150 to 185). A preferred biuret-modified polyisocyanate is prepared from a mixture of 2,4'- and 4,4'-MDI and/or a PMDI product which contains both 2,4'- and 4,4'-MDI in addition to polymethylene polyphenylisocyanate compounds.

It is also possible to introduce urethane groups into the biuret-modified polyisocyanate through reaction with one or more polyol compounds. This can be done (1) on the biuret-modified polyisocyanate, (2) on any of the starting polyisocyanate compounds before they are reacted to introduce biuret groups or (3) on a polyisocyanate compound that is used to dilute a biuret-modified polyisocyanate. The polyol used to introduce urethane groups preferably has a hydroxyl equivalent weight of about 30 to 2000, preferably up to 150. The isocyanate content of the resulting material preferably is within the ranges described before, i.e., from 20 to 30%, more preferably from 23 to 28%.

Flexible polyurethane foam is made from the biuret-modified polyisocyanate by reacting it with water and at least one polyol that has a hydroxyl equivalent weight of at least 800. Various other materials also can be used, together with these components, to make the foam, as described more fully below. The reaction is generally performed by bringing the various components of the foam formulation together and subjecting them to conditions such that the polyol, water and polyisocyanate can react to produce a high molecular weight polymer and a blowing gas. These conditions are well-known in the art. No special conditions are necessary to produce foam in accordance with this invention.

Therefore, the foam can be made using well-known slabstock processes, in which the foam formulation is poured into an open container and allowed to rise against its own weight against little or no applied constraint, or using a molded foam process, in which the foam formulation is introduced into a closed mold where its expansion is restricted by the internal dimensions of the mold. In slabstock processes, it is common to bring the various components of the foam formulation individually into a mix head, where they are mixed and dispensed. A similar approach may be taken to produce molded foams, but in the latter case it is more common to prepare a formulated polyol mixture, which contains the polyol(s) and other isocyanate-reactive materials, and a formulated polyisocyanate component, and to introduce those components into a mix head and from there into the mold. Water can be blended into the polyol component or fed separately into the mix head.

Slabstock processes are generally conducted with the starting materials at approximately ambient or slightly elevated temperatures. A temperature range of from 15 to 45° C. is typical and from 15 to 35° C. is generally preferred.

A cold molding process is often used to produce the foam. In the cold molding process, the mold is preheated, typically to about 40 to 60° C., prior to introducing the foam formulation into it. Aluminum and epoxy molds are commonly used in this process, and may contain small vent holes to allow air to escape from the mold as the mold is filled. The manner in which the mold is filled is not considered to be critical. Therefore, various pour patterns can be used, as fit the particular manufacturing equipment on hand and the type of product being manufactured. Molded foam is usually demolded as soon as it has enough structural integrity to be removed from the mold without damaging the product. Postcuring may be performed to complete the cure and fully develop foam properties.

The foam formulation includes at least one polyol that has a hydroxyl equivalent weight of at least 800, preferably at least 1000 and still more preferably at least 1200. The hydroxyl equivalent weight may be as much as 3000, as much as 2000 or as much as 1800. A polyol of this type is sometime referred to herein as a "base" polyol, as it makes up by far the major proportion, by weight, of the isocyanate-reactive materials used to make the foam. A mixture of these polyols may be used, in which case they together form the "base" polyol. The base polyol(s) should, in the aggregate, have an average of at least 2, preferably at least 2.5 and still more preferably at least 2.8 hydroxyl groups per molecule, and may contain, on average, up to as many as 4 or up to 3.5 hydroxyl groups per molecule. Individual polyols that make up a base polyol mixture may have hydroxyl functionalities above or below these limits, so long as the base polyols in the aggregate have the aforementioned average hydroxyl functionalities.

The base polyols may be polyether or polyester types. Hydroxy-functional acrylate polymers and copolymers also are suitable. Various polyols that are prepared from vegetable oils and/or animal fats (or fatty acids derived therefrom) also can be used. These include, for example, castor oil; hydroxymethyl group-containing polyol as described in WO 2004/096882 and WO 2004/096883; amide group-containing polyol as described in WO 2007/019063; hydroxyl ester-substituted fatty acid esters as described in WO 2007/019051; "blown" soybean oil as described in US Published Patent Applications 2002/0121328, 2002/0119321 and 2002/0090488; an oligomerized vegetable oil or animal fat as described in WO 06/116456; hydroxyl-containing cellulose-lignin materials and hydroxyl-containing modified starches.

Polyether polyols are referred base polyol(s). These include homopolymers of propylene oxide or a copolymer (random or block) of propylene oxide and ethylene oxide. The base polyol(s) in the aggregate preferably have mainly primary hydroxyl groups, although individual polyols that make up a base polyol mixture may contain varying proportions of primary and secondary hydroxyl groups.

The base polyol may also be or include a polymer polyol, by which is meant a dispersion of finely dispersed polymer particles in a continuous polyol phase. The polyol(s) that constitute the continuous polyol phase should have characteristics of the base polyol as described above. The dispersed polymer particles may be, for example, polyurea, polyurethane, polyurethane-urea, polystyrene, polyacrylonitrile, polystyrene-co-acrylonitrile or other types. The solids content (i.e., weight of dispersed phase as a percentage of the total weight of the base polyol) may be from 1 to 65%.

A base polyol of interest is a propylene oxide homopolymer which is end-capped with polyoxyethylene blocks to introduce mainly primary hydroxyl groups onto the ends of the polymer chain. The ethylene oxide content of such a polyol may be from 8 to 30% by weight; its equivalent weight may be from 800 to 2000, from 1000 to 2000 or from 1200 to 2000; its average hydroxyl functionality may be from 2.5 to 4.5 or, preferably, from 3.0 to 4.5; and its primary hydroxyl content may be from 70 to 100% or from 80 to 100%. Such a polyol can be prepared by adding propylene oxide and ethylene oxide sequentially to a starter compound or compounds which have, on average, the number of hydroxyl groups per molecule that is desired in the final product. It is noted that all polyether polyol hydroxyl functionalities described herein are "nominal" functionalities, i.e., those of the initiator compounds used to prepare them. It is well known that actual polyol functionalities tend to be somewhat lower than the nominal functionalities, due to the production of monofunctional impurities during the polymerization process. Two or more polyols of this type can be used.

Polyether polyols which are initiated with amines can be used. These polyols contain tertiary amino groups and for that reason tend to be auto-catalytic. An example of such a polyol is a bis (3-aminopropyl)methylamine-initiated polyol.

A preferred base polyol mixture contains, in addition to the block copolymer just described, a random copolymer of from 70-95% of propylene oxide and from 5 to 30% of ethylene oxide. This random copolymer should have from 0-70% primary hydroxyl groups, its equivalent weight may be from 800 to 2000, or from 1000 to 2000; and its average hydroxyl functionality may be from 2.5 to 4.5 or, preferably, from 2.8 to 4.5. Such a polyol preferably constitutes from 10-50%, preferably from 20-40%, of the total weight of the base polyol. The presence of such a polyol in the base polyol mixture has been found to increase the processing latitude, in that good quality foam which as naked foam exhibits a class 3 IM or even class 1 IM rating on the UNI 9175 C.S.E. RF4 test, over a range of isocyanate indices, especially when an alkali metal carboxylate is present in the foam formulation, and even in the absence of an added flame retardant.

A still more preferred base polyol mixture contains (i) a propylene oxide homopolymer which is end-capped with polyoxyethylene blocks and has an ethylene oxide content from 8 to 30% by weight, an equivalent weight from 1200 to 2000, a average hydroxyl functionality of from 3.6 to 4.5, and a primary hydroxyl content from 75 to 100%, (ii) a propylene oxide homopolymer which is end-capped with polyoxyethylene blocks and has an ethylene oxide content from 8 to 30% by weight, an equivalent weight from 1200 to 2000, a average hydroxyl functionality of from 2.5 to 3.5, and primary hydroxyl content from 75 to 100% and (iii) a random copolymer of from 70-95% of propylene oxide and from 5 to 30% of ethylene oxide which has from 0-70% primary hydroxyl groups, an equivalent weight of from 1000 to 1800; and an average hydroxyl functionality may be from 2.5 to 4.5 or, preferably, from 2.8 to 4.5. The weight ratios of (i), (ii) and (iii) may be from 25-60% of (i), from 15-50% of (ii) and from 10-50% of (iii). Preferred ranges are from 30-50% of (i), from 15-35% of (ii) and from 20-40% of (iii). These mixtures can be processed over a particularly wide range of isocyanate indices to provide good quality foam which performs well on the UNI 9175 C.S.E RF4 test and the California 117 test, especially when an alkali metal carboxylate is also present in the foam formulation.

The foam formulation includes water, in an amount from about 3 to about 5 parts per 100 parts by weight of the base polyol(s). A preferred amount is from 3 to 4 parts of water per 100 parts by weight of the base polyol.

At least one catalyst normally will be present in the foam formulation. One preferred type of catalyst is a tertiary amine catalyst. The tertiary amine catalyst may be any compound possessing catalytic activity for the reaction between a polyol and a polyisocyanate and at least one tertiary amine group. Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis (dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine Low (up to 200) hydroxyl equivalent weight polyols that are amine-initiated are also useful catalysts. These include polyols initiated with bis(3-aminopropyl)methylamine.

Reactive (non-fugitive) amine catalysts are preferred types, as these can react with isocyanate groups and become bound into the polyurethane polymer structure. Amine catalysts sometimes can be partially or entirely replaced by amine-iniiated polyether polyols, which can form part of or all of the base polyol.

The foam formulation may contain one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 1 part by weight per 100 parts by weight of polyol or polyol mixture. Organometallic catalysts are typically used in amounts towards the low end of these ranges.

The foamable composition may contain a crosslinker, which preferably is used, if at all, in small amounts, to 2 parts, up to 0.75 parts, or up to 0.5 parts by weight per 100 parts by weight of the base polyol). The crosslinker contains at least three isocyanate-reactive groups per molecule and has an equivalent weight, per isocyanate reactive group, of from 30 to about 125 and preferably from 30 to 75. Aminoalcohols such as monoethanolamine, diethanolamine and triethanolamine are preferred types.

A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8715LF, and B-8719LF, and Niax™ L2171 surfactant from OSi Specialties. Non-hydrolyzable liquid organosilicones are more preferred. When a surfactant is used, it is typically present in an amount of 0.0015 to 1 part by weight per 100 parts by weight polyol or polyol mixture.

It is preferred to include a small amount of an alkali metal carboxylate in the foam formulation. The alkali metal may be lithium, sodium or, preferably, potassium. The carboxylate group is preferably a monocarboxylate, and preferably has from 2 to 12, especially from 2 to 4 carbon atoms. Potassium acetate is a preferred alkali metal carboxylate. It is generally present in an amount from 0.05 to 0.3 parts by weight, per 100 parts by weight of the base polyols. A preferred amount is from 0.05 to 0.2 parts by weight.

In addition to the foregoing, various other components may be included in the foam formulation. These include, for example, additional blowing agents, chain extenders, plasticizers, fillers, colorants, preservatives, odor masks, flame retardants, biocides, antioxidants, UV stabilizers, antistatic agents, thixotropic agents and cell openers.

Although it is preferred that no additional blowing agent (other than the water) be included in the foamable polyurethane composition, it is within the scope of the invention to include an additional physical or chemical blowing agent. Among the physical blowing agents are gaseous or supercritical $CO_2$ and various hydrocarbons, fluorocarbons, hydrofluorocarbons, chlorocarbons (such as methylene chloride), chlorofluorocarbons and hydrochlorofluorocarbons. Chemical blowing agents are materials that decompose or react (other than with isocyanate groups) at elevated temperatures to produce carbon dioxide and/or nitrogen.

A chain extender is a material having exactly two isocyanate-reactive groups/molecule and has an equivalent weight per isocyanate-reactive group can range from about 30 to about 125, but is preferably from 30 to 75. The isocyanate-reactive groups are preferably aliphatic alcohol, primary amine or secondary amine groups, with aliphatic alcohol groups being particularly preferred. Examples of chain extenders include alkylene glycols such as ethylene glycol, 1,2- or 1,3-propylene glycol, 1,4-butanediol, 1,6-hexanediol, and the like; glycol ethers such as diethylene glycol, triethylene glycol, dipropylene glycol, tripropylene glycol and the like; cyclohexane dimethanol; and the like.

Examples of suitable fillers include melamine, melamine derivatives, expandable graphite, APP, kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler. When used, fillers advantageously constitute from about 0.5 to about 30%, especially about 0.5 to about 10%, by weight of the composition.

The foam is preferably prepared in the absence of added flame retardants, such as halogenated and/or phosphorus-containing compounds.

The amount of polyisocyanate that is used typically is sufficient to provide an isocyanate index of from 70 to 120, although wider ranges can be used in special cases. A preferred range is from 70 to 110 and a more preferred range is from 75 to 105. An advantage of the invention is that the same foam formulation often can be used to produce foams of distinct hardness grades, simply by varying the isocyanate index, while still obtaining good physical properties and the ability to pass the UNI 9175 C.S.E RF4 test and/or the California 117 test.

The product foam is characterized in having a resiliency, as determined using the ASTM D-3574 ball rebound test, which measures the height a ball rebounds from the surface of the foam when dropped under specified conditions. Under the ASTM test, the foam exhibits a resiliency of at least 40%, especially at least 50%.

The foam advantageously has a density in the range of 2.0 to 6 pounds/cubic foot (pcf) (32-96 kg/m$^3$), preferably from 2.5 to 4 pounds/cubic foot (40-64 kg/m$^3$) Density is conveniently measured according to ASTM D 3574.

Foam produced in accordance with the invention often and preferably meets the requirements for a class 3 IM class or, preferably, a 1 IM rating on the UNI 9175 C.S.E. RF4 test, when tested as naked (uncovered) foam. It is especially preferred that naked (uncovered) foams of the invention meet such requirements for class 3 IM or class 1 IM foam on this test, even when such foams do not contain any added flame retardants.

Although the invention is not limited to any theory, it is believed that the performance of the foams on these fire tests is attributable, at least in part, to the thermal breakdown of the biuret linkages when exposed to high temperatures such as are encountered in fire situations. It is theorized that, due to the high concentration of the biuret linkages in the polymer structure, when the biuret linkages decompose, the crosslink density of the polymer decreases abruptly and quite substantially, which permits the polymer to act much like a thermoplastic material. The polymer can then shrink away from a flame or other source of intense heat, which reduces its exposure to ignition conditions and therefore reduces the extent to which it will burn.

Foam made in accordance with the invention is useful in a variety of packaging and cushioning applications. Seating applications are of particular interest, including, for example, chairs, sofas, recliners, benches, chaises, ottomans, and similar products. Other seating products include cushioned furniture for office or institutional use, as well as seats for automobiles and other vehicles. Typically, the foam is covered with a covering of a fabric, plastic, leather or similar material, which is generally selected based on aesthetic and functional considerations, and the covered fabric is supported on a structural support.

The following examples are provided to illustrate the invention, but are not intended to limit the scope thereof. All parts and percentages are by weight unless otherwise indicated.

EXAMPLES 1-5

A. Preparation of Biuret-Containing Isocyanate 100 parts by weight of a 50/50 by weight mixture of the 2,4'- and 4,4'-isomers of MDI are charged to a stainless steel reactor equipped with a recycle line, internal heater with controls, and variable speed stirrer. The MDI is heated to 105° C. with stirring and recycling through the recycle line, which contains an in-line static mixer. Nitrogen is fed into the top of the reactor, and 1.8 parts of water are added to the MDI over 75 minutes by injecting it into the recycle line while stirring and maintaining the reaction temperature at 105° C. After the water addition is completed, the temperature is increased to 120° C. and held there, with continued stirring, for another two hours, after which the reaction mixture is cooled. This material contains 26% by weight of isocyanate groups, approximately 36% by weight of biuret oligomers and about 1% by weight of urea-containing compounds. The biuret compounds mainly contain 1, 2 or 3 biuret groups and isocyanate functionalities of from 3 to 6, but some higher molecular weight and functionality oligomers also are present. 61.1 parts by weight of this product is diluted with 9 parts of a PMDI and 29.9 parts of a 50/50 by weight mixture of 2,4'- and 4,4'-MDI to produce an isocyanate composition that contains about 22% by weight of biuret oligomers.

A polyol composition is prepared from the following ingredients:

| | |
|---|---|
| Polyol A | 25 parts by weight |
| Polyol B | 36.45 parts by weight |
| Polyol C | 30 parts by weight |
| Water | 3.7 parts by weight |
| Diethanolamine | 0.3 parts by weight |
| Amine Catalysts | 0.8 parts by weight |
| Potassium Acetate Solution | 0.1 parts by weight |
| Silicone Surfactant | 0.5 parts by weight |

Polyol A is a nominally trifunctional block copolymer of propylene oxide and ethylene oxide containing 14.5% by weight ethylene oxide and having about 85% primary hydroxyl groups. Its hydroxyl equivalent weight is 1900. Polyol B is a block copolymer of propylene oxide and ethylene oxide made using a mixture of initiators. Its nominal functionality is 4.2. Its equivalent weight is about 1725 and it contains 77% primary hydroxyl groups. Polyol C is a 3400 molecular weight, nominally trifunctional random copolymer of propylene oxide and ethylene oxide that contains mostly secondary hydroxyl groups.

This composition is processed into foam by reacting it with the isocyanate composition described above, using a high pressure mixing and dispensing machine. The mold is a square mold which is preheated to 50° C., and which has been treated with a mold release agent. The foam formulation is permitted to cure in the mold until it has cured enough to be demolded. Foam examples 1-5 are made in this manner, each at a different isocyanate index, to produce a series of foams of different hardnesses. Examples 1-5 are made at isocyanate indices of 70, 80, 90, 100 and 110, respectively. Each foam has a core density of about 55 kg/m$^3$.

Indentation load deflection is measured on each of Examples 1-5 using the Fiat 7M 3800 method. Resiliency is measured for each of Examples 2-5 according to the ASTM D 3574 ball rebound test. 40% compressive stress is measured for each of Examples 2-5 according to ISO 3386-2. Tear strength, tensile strength and elongation at break and compression set are measured for each of Examples 2-5 according to ASTM D3574. Results are as indicated in Table 1 below.

TABLE 1

| | Ex. 1 | Ex. 2 | Ex. 3 | Ex. 4 | Ex. 5 |
|---|---|---|---|---|---|
| Isocyanate index | 70 | 80 | 90 | 100 | 110 |
| ILD, dN | 14.4 | 19.6 | 30.1 | 45.4 | 66.0 |
| Resiliency, % | — | 53 | 54 | 56 | 56 |
| 40% compressive stress, kPa | — | 2.9 | 4.2 | 6.1 | 8.6 |
| Tear strength, N/m | — | 143 | 144 | 162 | 173 |
| Tensile strength, N/m$^2$ | — | 0.065 | 0.094 | 0.092 | 0.093 |
| Elongation, | — | 80 | 82 | 61 | 59 |
| Compression Set, % | — | 17.3 | 15.5 | 13.9 | 14.6 |

These results show that good quality foams can be prepared over a wide isocyanate index range, with the foam hardness (ILD) being widely adjustable in that manner.

Examples 2-5 are repeated, this time producing foam samples for assembly into a test specimen as required by the UNI 9175 C.S.E RF4 test. The foam that represents the chair back has a length of 450 mm, a width of 300 mm and a thickness of 75 mm. The foam that represents the seat has a length of 450 mm, a width of 150 mm and a thickness of 75 mm. The back and seat foams are assembled on a metal frame for the test procedure. Foam density is again about 55 kg/m$^3$. The foams are conditioned at 25° C. and 65% relative humidity for 24 hours, then at 80° C. and 80% relative humidity for 72 hours, and then reconditioned at 25$^2$C at 65% relative humidity for at least 12 hours prior to evaluating them according to the UNI 9175 C.S.E. RF4 test. The assemblies are separately exposed to an igniting flame for 140 seconds, without a fabric covering, and the igniting flame is removed. The amount of time that elapses before the foam stops burning (visible flame) is recorded. Examples 2 and 3 do not ignite, and therefore this time is zero seconds in those cases. Examples 4 and 5 burn for 14 seconds and 13 seconds, respectively. Each of Examples 2-5 is classified as Class 1 IM under this test, even though they are naked (uncovered) foams which do not contain any flame retardant additives. In addition, the Class 1 IM rating is achievable over a range of foam hardnesses, which are produced using the same formulation in each case, varying only the isocyanate index.

EXAMPLES 6-11

Foam examples 6-11 are made in the same manner described with respect to Example 1-5, except the following polyol composition is used. The isocyanate is the same as used to make Examples 1-5. The polyol composition is:

| Polyol A | 14 parts by weight |
|---|---|
| Polyol B | 36.15 parts by weight |
| Polyol C | 30 parts by weight |
| Polyol D | 15 parts by weight |
| Water | 3.7 parts by weight |
| Diethanolamine | 0.3 parts by weight |
| Amine Catalysts | 0.9 parts by weight |
| Potassium Acetate Solution | 0.1 parts by weight |
| Silicone Surfactant | 0.5 parts by weight |

Polyol D is a nominally trifunctional polyether polyol which contains styrene-acrylonitrile particles (average particle size 1.4 microns). Polyol D has a hydroxyl equivalent weight of 2640. Physical properties of foam Examples 6-11 are evaluated as described with respect to the earlier examples, with results as reported in Table 2.

TABLE 2

|  | Ex. 6 | Ex. 7 | Ex. 8 | Ex. 9 | Ex. 10 | Ex. 11 |
|---|---|---|---|---|---|---|
| Isocyanate index | 80 | 85 | 90 | 95 | 100 | 105 |
| ILD, dN | 26.3 | 33.3 | 36.8 | 44.8 | 51.2 | 65 |
| Resiliency, % | 56 | 55 | 56 | 56 | 56 | 57 |
| 40% compressive stress, kPa | 3.8 | 4.9 | 5.7 | 6.7 | 8.3 | 8.9 |
| Tear strength, N/m | 178 | 201 | 192 | 196 | 199 | 201 |
| Tensile strength, N/m$^2$ | 0.08 | 0.085 | 0.14 | 0.14 | 0.156 | 0.168 |
| Elongation, % | 68 | 71 | 82 | 74 | 75 | 76 |

EXAMPLES 12-17

Foam examples 12-17 are made in the same manner described with respect to Example 1-5, except the following polyol composition is used. The isocyanate is the same as used to make Examples 1-5. The polyol composition is:

| Polyol A | 29 parts by weight |
|---|---|
| Polyol B | 36.15 parts by weight |
| Polyol E | 30 parts by weight |
| Water | 3.7 parts by weight |
| Diethanolamine | 0.3 parts by weight |
| Amine Catalysts | 0.7 parts by weight |
| Potassium Acetate Solution | 0.1 parts by weight |
| Silicone Surfactant | 0.5 parts by weight |

Polyol E is a nominally trifunctional poly(propylene oxide) having 8.6% of an ethylene oxide cap. It contains 54% primary hydroxyl groups and has a hydroxyl equivalent weight of 990. Physical properties of foam Examples 12-17 are evaluated as described with respect to the earlier examples, with results as reported in Table 3.

TABLE 3

|  | Ex. 12 | Ex. 13 | Ex. 14 | Ex. 15 | Ex. 16 | Ex. 17 |
|---|---|---|---|---|---|---|
| Isocyanate index | 80 | 85 | 90 | 95 | 100 | 105 |
| ILD, dN | 21.4 | 23.4 | 32.2 | 35.6 | 48.4 | 53.2 |
| Resiliency, % | 50- | 50 | 50 | 51 | 53 | 52 |
| 40% compressive stress, kPa | 3.2 | 4.1 | 4.8 | 5.6 | 6.5 | 7.5 |
| Tear strength, N/m | 238 | 232 | 257 | 243 | 251 | 248 |
| Tensile strength, N/m$^2$ | 0.08 | 0.085 | 0.14 | 0.14 | 0.156 | 0.168 |
| Elongation, | 96 | 93 | 101 | 98 | 95 | 106 |

EXAMPLES 18-23

Foam examples 18-23 are made in the same manner described with respect to Example 1-5, except the following polyol composition is used. The isocyanate is the same as used to make Examples 1-5. The polyol composition is:

| Polyol A | 30 parts by weight |
|---|---|
| Polyol B | 41.75 parts by weight |
| Polyol F | 20 parts by weight |
| Polyol G | 3 parts by weight |
| Water | 3.7 parts by weight |
| Diethanolamine | 0.35 parts by weight |
| Amine Catalysts | 0.8 parts by weight |
| Silicone Surfactant | 0.5 parts by weight |

Polyol F is a commercially dispersoin of urea particles in a polyether polyol, which carries the trade designation Desmophen GT 7029. Polyol G is a nominally trifunctional, random copolymer of ethylene oxide and propylene oxide that contains 71-76% by weight ethylene oxide and has an equivalent weight of about 1675. Physical properties of foam Examples 18-23 are evaluated as described with respect to the earlier examples, with results as reported in Table 4.

TABLE 4

|  | Ex. 18 | Ex. 19 | Ex. 20 | Ex. 21 | Ex. 22 | Ex. 23 |
|---|---|---|---|---|---|---|
| Isocyanate index | 80 | 85 | 90 | 95 | 100 | 105 |
| ILD, dN | 26.6 | 31 | 38.2 | 44.8 | 54.3 | 63.8 |
| Resiliency, % | 54 | 54 | 54 | 53 | 54 | 56 |
| 40% compressive stress, kPa | 3.7 | 4.7 | 5.7 | 6.5 | 7.6 | 8.8 |
| Tear strength, N/m | 239 | 232 | 257 | 242 | 254 | 239 |
| Tensile strength, N/m$^2$ | 0.105 | 0.1 | 0.15 | 0.15 | 0.16 | 0.16 |
| Elongation, | 101 | 95 | 88 | 85 | 95 | 99 |

EXAMPLES 24-29

Foam examples 24-29 are made in the same manner described with respect to Example 1-5, except the following polyol composition is used. The isocyanate is the same as used to make Examples 1-5. The polyol composition is:

| Polyol A | 29.1 parts by weight |
|---|---|
| Polyol B | 40.5 parts by weight |
| Polyol C | 15 parts by weight |
| Polyol F | 10 parts by weight |
| Water | 3.7 parts by weight |
| Diethanolamine | 0.30 parts by weight |
| Amine Catalysts | 0.9 parts by weight |
| Silicone Surfactant | 0.5 parts by weight |

Physical properties of foam Examples 24-29 are evaluated as described with respect to the earlier examples, with results as reported in Table 5.

TABLE 5

|  | Ex. 24 | Ex. 25 | Ex. 26 | Ex. 27 | Ex. 28 | Ex. 29 |
|---|---|---|---|---|---|---|
| Isocyanate index | 80 | 85 | 90 | 95 | 100 | 105 |
| ILD, dN | 34 | 40.5 | 54.6 | 64 | 74.5 | 80.2 |
| Resiliency, % | 64 | 62 | 64 | 61 | 60 | 61 |
| 40% compressive stress, kPa | 4.9 | 5.7 | 6.6 | 8.5 | 9.5 | 13 |
| Tear strength, N/m | 215 | 250 | 238 | 221 | 199 | 187 |
| Tensile strength, N/m$^2$ | 0.101 | 0.11 | 0.11 | 0.09 | 0.09 | 0.09 |
| Elongation, | 66 | 58 | 61 | 71 | 72 | 73 |
| Compression Set, % | 12.7 | 10.6 | 9.6 | 8.9 | 8.7 | 8.5 |

EXAMPLES 30-32

Foam examples 30-32 are made in the same manner described with respect to Example 1-5, except the following polyol composition is used. The isocyanate is the same as used to make Examples 1-5. The polyol composition is:

| Polyol A | 30 parts by weight |
| Polyol B | 41.75 parts by weight |
| Polyol F | 20 parts by weight |
| Polyol G | 3 parts by weight |
| Water | 3.7 parts by weight |
| Diethanolamine | 0.35 parts by weight |
| Amine Catalysts | 0.8 parts by weight |
| Potassium Acetate solution | 0.1 parts by weight |
| Silicone Surfactant | 0.6 parts by weight |

Physical properties of foam Examples 30-32 are evaluated as described with respect to the earlier examples, with results as reported in Table 6.

TABLE 6

|  | Ex. 30 | Ex. 31 | Ex. 32 |
|---|---|---|---|
| Isocyanate index | 85 | 95 | 105 |
| ILD, dN | 34 | 42.7 | 65.4 |
| Resiliency, % | 63 | 62 | 57 |
| 40% compressive stress, Pa | 4.8 | 8.5 | 11.3 |
| Tear strength, N/m | 188 | 180 | 168 |
| Tensile strength, N/m$^2$ | 0.101 | 0.11 | 0.11 |
| Elongation, | 75 | 58 | 64 |
| Compression Set, % | 14.9 | 9.9 | 9.8 |

The invention claimed is:

1. A process for preparing a flexible polyurethane foam, comprising
   A. forming a reaction mixture including water, an alkali metal carboxylate salt, at least one polyisocyanate and at least one catalyst and
   B. subjecting the reaction mixture to conditions sufficient to cause the reaction mixture to expand and cure to form a polyurethane foam having a density of from 1.8 to 4 pounds per cubic foot and which exhibits a value of at least 40% on the ASTM D 3574 ball rebound test, wherein
      the polyisocyanate is a diphenylmethane diisocyanate and/or polymethylene polyphenylisocyanate, which is modified to contain at least 20% by weight of biuret-containing oligomers that have three or more isocyanate groups and the reaction mixture further contains (i) a propylene oxide homopolymer which is end-capped with polyoxyethylene blocks and has an ethylene oxide content from 8 to 30% by weight, an equivalent weight from 1200 to 2000, an average hydroxyl functionality of from 3.6 to 4.5, and a primary hydroxyl content from 75 to 100%, (ii) a propylene oxide homopolymer which is end-capped with polyoxyethylene blocks and has an ethylene oxide content from 8 to 30% by weight, an equivalent weight from 1200 to 12000, a average hydroxyl functionality of from 2.5 to 3.5, and primary hydroxyl content from 75 to 100% and (iii) a random copolymer of from 70-95% of propylene oxide and from 5 to 30% of ethylene oxide which has from 0-70% primary hydroxyl groups, an equivalent weight of from 1000 to 2000; and an average hydroxyl functionality from 2.5 to 4.5.

2. The process of claim 1 wherein the reaction mixture is devoid of a halogenated or phosphorus-containing flame retardant.

3. The process of claim 1, wherein the polyurethane foam exhibits, as naked foam, at least a class 3 IM rating on the UNI 9175 C.S.E. FR4 test.

4. The process of claim 3, wherein the polyurethane foam exhibits, as naked foam, a class 1 IM rating on the UNI 9175 C.S.E. FR4 test.

5. The process of claim 1 wherein the polyisocyanate is produced in a process that includes reacting 2,4'-MDI, 4,4'-MDI, a mixture of 2,4'- and 4,4'-MDI, or a polymethylene polyphenylisocyanate, with water.

* * * * *